United States Patent
Caño et al.

(10) Patent No.: US 11,150,850 B1
(45) Date of Patent: Oct. 19, 2021

(54) PRINT RELEASE TO IMAGING DEVICE FROM MOBILE COMPUTING DEVICE

(71) Applicant: LEXMARK INTERNATIONAL, INC., Lexington, KY (US)

(72) Inventors: Larraine Belleza Caño, Talisay (PH); Richmond Fajardo Enriquez, Cebu (PH); Froilan Balaga Guioguio, Jr., Cebu (PH); Ralph Lester Borces Rabor, Cebu (PH); Christopher Gerald Gamboa Santos, Mandaue (PH)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 0 days.

(21) Appl. No.: 16/894,976

(22) Filed: Jun. 8, 2020

(51) Int. Cl.
  *G06F 3/12* (2006.01)
  *G06K 19/06* (2006.01)

(52) U.S. Cl.
  CPC ............ *G06F 3/1222* (2013.01); *G06F 3/128* (2013.01); *G06F 3/1238* (2013.01); *G06F 3/1292* (2013.01); *G06K 19/06037* (2013.01)

(58) Field of Classification Search
  None
  See application file for complete search history.

(56) References Cited

U.S. PATENT DOCUMENTS

| | | | | |
|---|---|---|---|---|
| 7,043,688 B1* | 5/2006 | Tsutsumi | ............... | G06F 3/1204 358/1.15 |
| 7,502,133 B2* | 3/2009 | Fukunaga | .......... | H04N 1/00132 358/1.15 |
| 10,244,037 B2* | 3/2019 | Yagiura | ................... | H04L 67/10 |
| 2007/0165273 A1* | 7/2007 | Miyamura | ............... | H04N 1/44 358/1.15 |
| 2011/0085196 A1* | 4/2011 | Liu | ........................ | G06F 3/1204 358/1.15 |
| 2012/0002980 A1* | 1/2012 | Tse | ........................ | G06F 3/1204 399/8 |
| 2013/0021643 A1* | 1/2013 | Nuggehalli | ........ | H04N 1/00331 358/1.15 |
| 2013/0083337 A1* | 4/2013 | Tecu | ..................... | G06F 3/1204 358/1.13 |

(Continued)

OTHER PUBLICATIONS

Wirth Consulting; New Xerox Instant Print with Print-From-Cloud, More; https://wirthconsulting.org/2019/02/27/new-xerox-instant-print-kiosk-with-print-from-cloud-more/; 3 pg.

(Continued)

*Primary Examiner* — Henok Shiferaw

(57) ABSTRACT

A system includes a spool directory accessible by a mobile computing device and an imaging device. A user selects for imaging on the imaging device a file accessible by the mobile computing device. The mobile computing device saves the file on the spool directory with a unique name. Upon the user accessing the imaging device for imaging, the imaging device generates a unique quick response code. The user captures the code with a camera of the mobile computing device and the code is used by the mobile computing device to rename the file on the spool directory. That the imaging device knows the quick response code, the imaging device accesses and prints the file on media for the user.

20 Claims, 3 Drawing Sheets

(56) References Cited

U.S. PATENT DOCUMENTS

| | | | | |
|---|---|---|---|---|
| 2013/0173754 A1* | 7/2013 | van Os | ................... | H04L 67/02 |
| | | | | 709/219 |
| 2013/0194623 A1* | 8/2013 | Tecu | ..................... | G06F 3/1292 |
| | | | | 358/1.15 |
| 2014/0082139 A1* | 3/2014 | Shimomoto | .......... | G06F 3/1292 |
| | | | | 709/217 |
| 2014/0368865 A1* | 12/2014 | Gutnik | .................. | G06F 3/1267 |
| | | | | 358/1.15 |
| 2015/0178023 A1* | 6/2015 | Marquardt | .............. | G06F 3/129 |
| | | | | 358/1.14 |
| 2016/0224680 A1 | 8/2016 | Maynard, II et al. | | |
| 2020/0004469 A1* | 1/2020 | Tomida | ................ | G06F 3/1231 |

OTHER PUBLICATIONS

Papercut; Papercut Mobile Print Release;www.papercut.com/tour/mobile-print-release/; as of Jun. 17, 2020; 20 pg.

Xerox; Xerox Instant Print Kiosk brochure; www.xerox.com; Feb. 2020; 4 pg.

Xerox; Xerox Instant Print Kiosk spec. sheet; www.xerox.com; Feb. 2020; 6 pg.

\* cited by examiner

PRINT RELEASE TO IMAGING DEVICE FROM MOBILE COMPUTING DEVICE

FIELD OF THE INVENTION

The present invention relates to imaging devices, such as printers and copiers, and mobile computing devices, such as smart phones and tablets. It relates also to printing on imaging devices files or documents released from the mobile computing device. Embodiments of the invention contemplate print-release imaging without requiring sign-in or verification credentials. It is suitable in community and kiosk printing environments or other situations where users of the mobile computing device do not have immediate access to a dedicated or proprietary imaging device. Computing applications, computing environments, systems, software, interfaces, methods and apparatus typify the embodiments.

BACKGROUND

Security challenges abound when printing images or documents in community or kiosk printing environments. One known challenge involves securely sending a print job or imaging request from a mobile computing device to a print server or cloud storage device and enabling users to retrieve the print job at any of the imaging devices in the community or kiosk environment. Traditional security schemes in this context involve the credentialing of users by registering and outfitting them with a security badge or other device that becomes read by a hardware reader of the imaging device. Still other schemes require logging-in the user at the imaging device with software or other username/password credentials. In either, dedicated hardware and or software support the imaging devices and must be harmonized throughout the many locations of the community or kiosk printers. Accordingly, the inventors recognize a need for more efficiently and uniquely identifying and retrieve imaging requests of users of mobile computing devices who seek imaging in a community or kiosk environment, especially without requiring external hardware or security complexity. Additional benefits and alternatives are also sought when devising solutions.

SUMMARY

The above-mentioned and other problems are solved within a system having a spool directory accessible by a mobile computing device and an imaging device. A user selects for imaging on the imaging device a file accessible by the mobile computing device. The mobile computing device saves the file on the spool directory with a unique name Upon the user engaging or accessing the imaging device for imaging, the imaging device generates a unique quick response (QR) code. The user captures the code with a camera of the mobile computing device and the code is used by the mobile computing device to rename the file on the spool directory. That the imaging device knows the QR code, the imaging device accesses and prints the file on media for the user. Software, computing applications, executable code, interfaces, computing system environments, methods, and apparatus typify the embodiments. In any, a more flexible way of executing mobile printing through community or kiosk printers is provided. The simplicity and flexibility of the solutions herein also maintain security without dedicated hardware or requiring uniformity of credentialing users throughout the community of kiosk printers. Other advantages will be readily identifiable by those skilled in the art.

In various embodiments, method and systems include novel approaches of (a) tagging a print job or imaging request at a mobile computing device and (b) securely retrieving it using QR codes at an imaging device in a community or kiosk printer environment. More completely, the methodology includes using (a) hash codes to determine a directory name where a print job is saved, and (b) using a QR code to allow the imaging device and mobile printing application on the mobile computing device to communicate how to securely retrieve the print job. An overview of processes includes: 1) sending the print job to a spool directory using a mobile print application ('app') on the mobile computing device; 2) generating a unique hash code with the mobile print app, wherein the hash code will be used as a unique name of the print job on the directory; 3) upon a user of the mobile computing device engaging the imaging device to retrieve their print job, generating a unique hash code by a device application on the imaging device generates and displaying a QR code generated therefrom; 4) capturing the QR code by a camera of the mobile computing device and interpreting the QR code with the mobile print app; 5) renaming the directory name by the mobile printing app of the mobile computing device; and 6) that the imaging device knows the QR code, finding in the directory the newly renamed print job. Requesting the print job from the directory and imaging it on media for the user occurs next.

These and other embodiments are set forth in the description below. Their advantages and features will become readily apparent to skilled artisans. The claims set forth particular limitations.

DETAILED DESCRIPTION OF THE ILLUSTRATED EMBODIMENTS

In the following detailed description, reference is made to the accompanying drawings where like numerals represent like details. The embodiments are described in sufficient detail to enable those skilled in the art to practice the invention. It is to be understood that other embodiments may be utilized and that changes may be made without departing from the scope of the invention. The following detailed description, therefore, is not to be taken in a limiting sense and the scope of the invention is defined only by the appended claims and their equivalents. In accordance with the features of the invention, imaging devices have computing applications facilitating print release from imaging requests of content, e.g., files or documents, originating from mobile computing devices.

Figure 1:
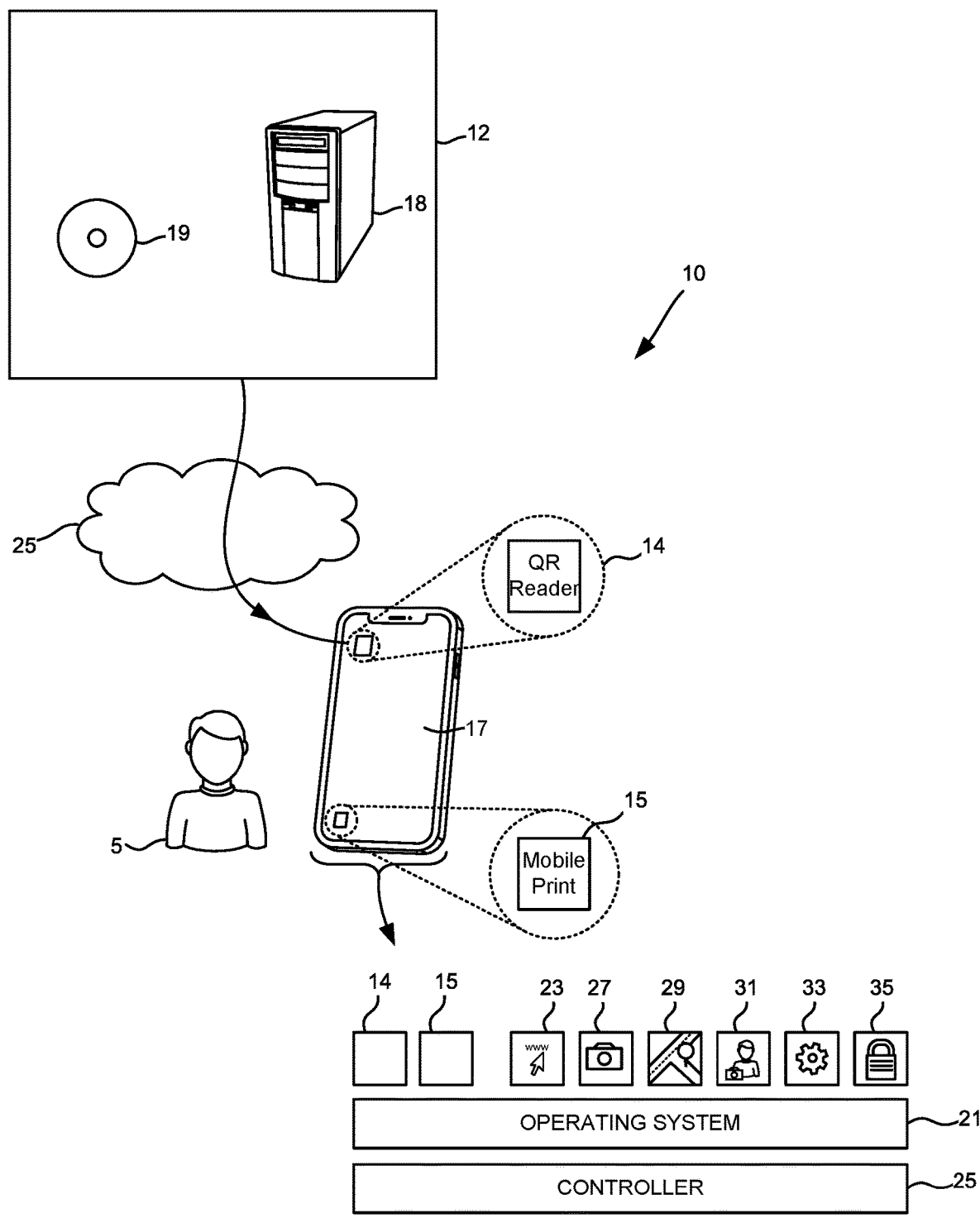
FIG. 1 is a diagrammatic view of a computing system environment according to the present embodiments for configuring a mobile computing device for imaging operations.

With reference to FIG. 1, users 5 need a quick response (QR) code reader 14 on their mobile computing device 16, e.g., smart phone, tablet, etc. The reader can be integral with or separate from a mobile imaging application, such as the mobile print application 15. Users obtain the reader and application in a computing system environment 10 having one or more service provider(s) 12 of mobile applications (colloquially "mobile 'apps'"), as is familiar. The provider makes available the applications that users download onto their device 16. The download resides as executable code on a computing device 18 such as a server or imprinted on a computer readable medium 19 such as a CD, smart card, USB stick, etc. Users retrieve the medium and load the application directly onto their mobile device or with assistance from still another computing device (not shown). Alternatively, users execute a series of functions on their mobile device and obtain the requisite code by way of an attendant computing network 25. The network includes or not a variety of software such as a website or an "app store" and hardware such as routers, servers, switches, desktop/laptop computers, phone transmission towers, satellites, etc. The connections typify wired and wireless communications between a few or many devices in an internet, intranet or other environment. Skilled artisans readily understand the process and the requisite actions for downloading applications.

Upon successful receipt of the reader and application 14, 15, the mobile computing device 16 hosts computing modules thereof on one or more controllers 25 resident in a housing 17. The controller(s) also host an operating system 21 and one or more additional mobile applications, as is typical. The additional applications also have functionality that can be accessed, opened or otherwise utilized by the reader 14 and application 15. These include, but are not limited to, a web browser 23, camera 27, map or GPS device 29, photo album 31, device settings 33, and security 35. Their functionality is known in the art. As examples, the settings 33 include items such as a serial number of the mobile computing device and a system clock that the mobile print app 15 can utilize to generate a timestamp of requesting imaging and or generating a secure hash, described below. The reader 14 and or application 15 can also utilize the function of the camera 27 to capture QR codes and or the map to 29 ascertain the whereabouts of community or kiosk imaging devices for conducting printing or other imaging requests. The mobile print app 15 can access the web browser 23 to create a document or image for printing on an imaging device. Skilled artisans can envision still other functionality.

Figure 2:
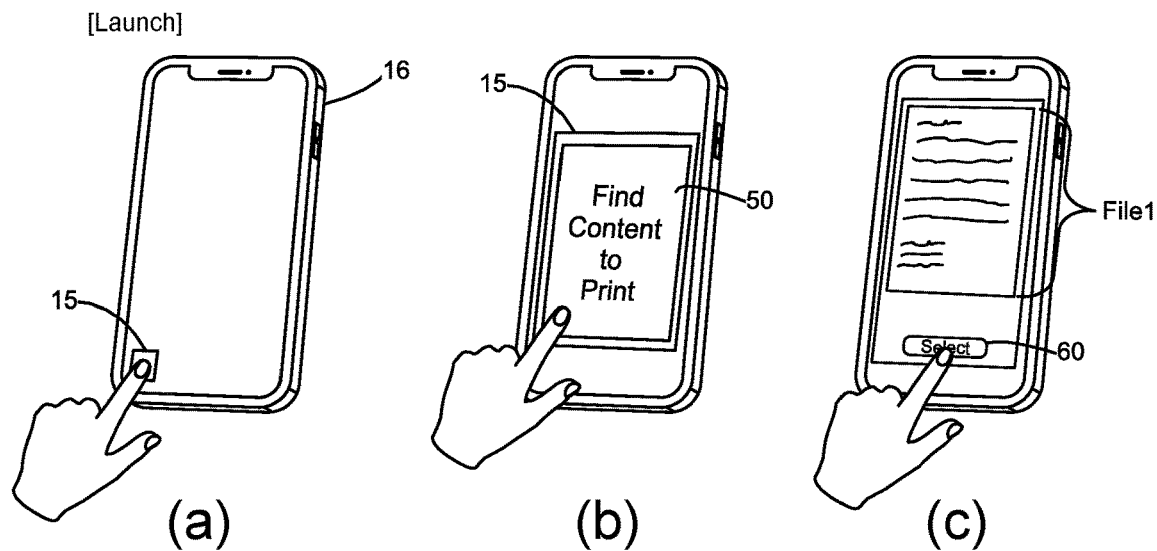
FIGS. 2(*a*)-2(*f*) are diagrammatic views according to the present embodiments for users of the mobile computing device to securely store content on a spool directory.
Figure 2:
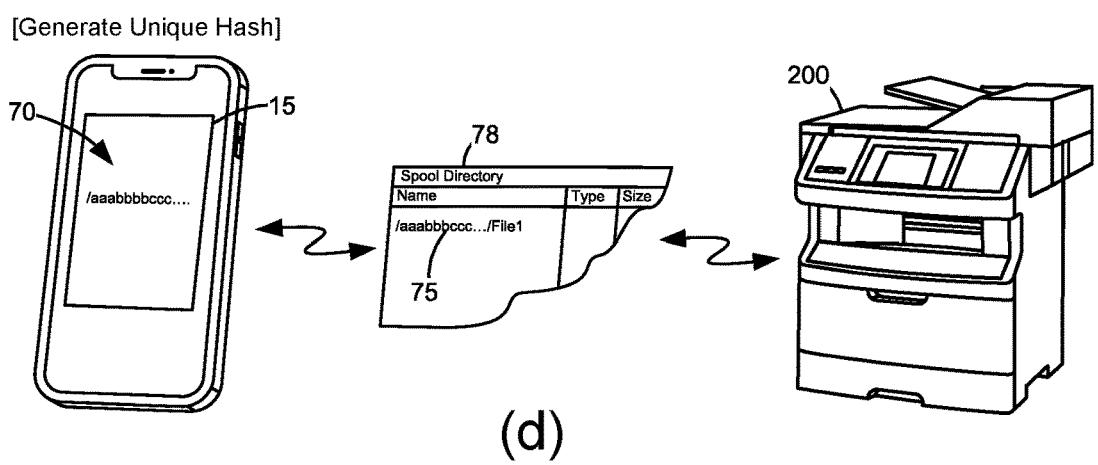
Figure 2:
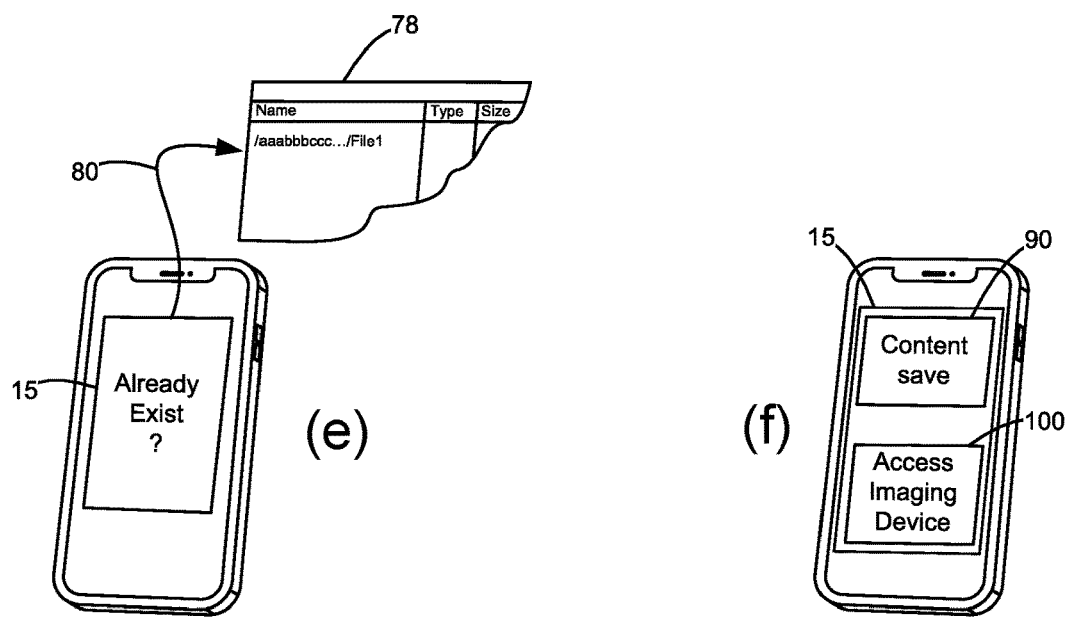

With reference to FIG. 2, users launch their mobile print app 15 at process 2(a) by selecting it on their mobile computing device 16. At process 2(b), users make a selection within the app to indicate content matter accessible by the mobile computing device for later release, by printing 50 on an imaging device. The content is any of a variety, but typifies a file, document, image, picture, photo, screenshot, website, or the like. At process 2(c), the app enables functionality on the mobile computing device to find the content for the user. This includes, but is not limited to, searching the internet, accessing file folders, accessing photos in a library, taking photos, accessing email, accessing sms messages, taking screenshots, opening other computing applications and or accessing their data, etc. Once found, such as File 1, the user indicates their selection at 60. At process 2(d), the mobile print app generates a unique hash 70 (not seen by users of the app 15, but made visible in FIG. 2(d) for illustration purposes) that will be used to uniquely name 75 and securely store the content of File 1 on a printing spool directory 78 accessible by both the mobile computing device 16 and the imaging device 200. The unique name is any of a variety, but some embodiments contemplate a unique character-based hash code (aaabbbcccddd . . . ). The hash code is generated in a variety of ways, but certain embodiments contemplate generating it from a timestamp of when the user selected 60 the content and or generating a hash based on a serial number of the mobile computing device, such as that accessible in the device settings 33 of FIG. 1. Regardless, at process 2(e), the mobile print app 15 next examines the uniqueness of the name 75 and whether or not a hash already exists 80 on the spool directory 78. If so, the mobile print app repeats the process at 2(d) and generates a new name 70 and confirms again or not if it exists 80 until it is found to be unique. If not, the name is confirmed as unique and the content is saved under that name at the spool directory at process 2(f). A confirmation 90 is provided to the user of the app, including or not instructions to obtain the content from an imaging device at 100. The instructions can also identify to the user a closest one or multiple nearby imaging devices. Users can also provide an identifier, such as a store name, zip code, etc. where they hope to retrieve their content and the app can suggest a location. The user can also interact with the app in other ways, like times to retrieve their content, etc.

Figure 3:
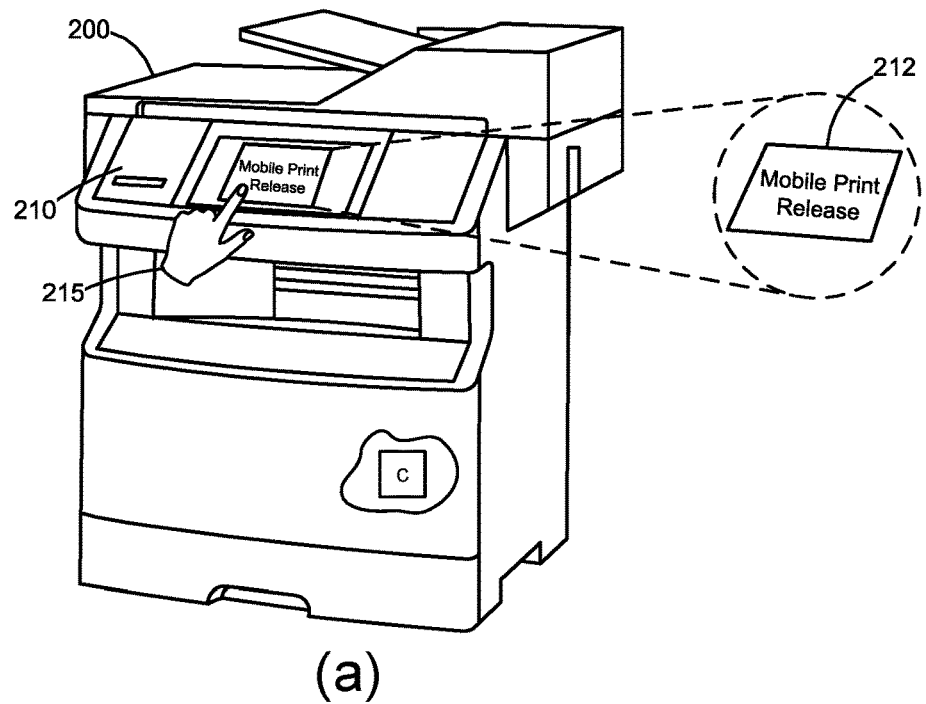
FIGS. 3(*a*) and 3(*b*) are diagrammatic views according to the present embodiments for users of the mobile computing device to retrieve on media their stored content from imaging devices.
Figure 3:
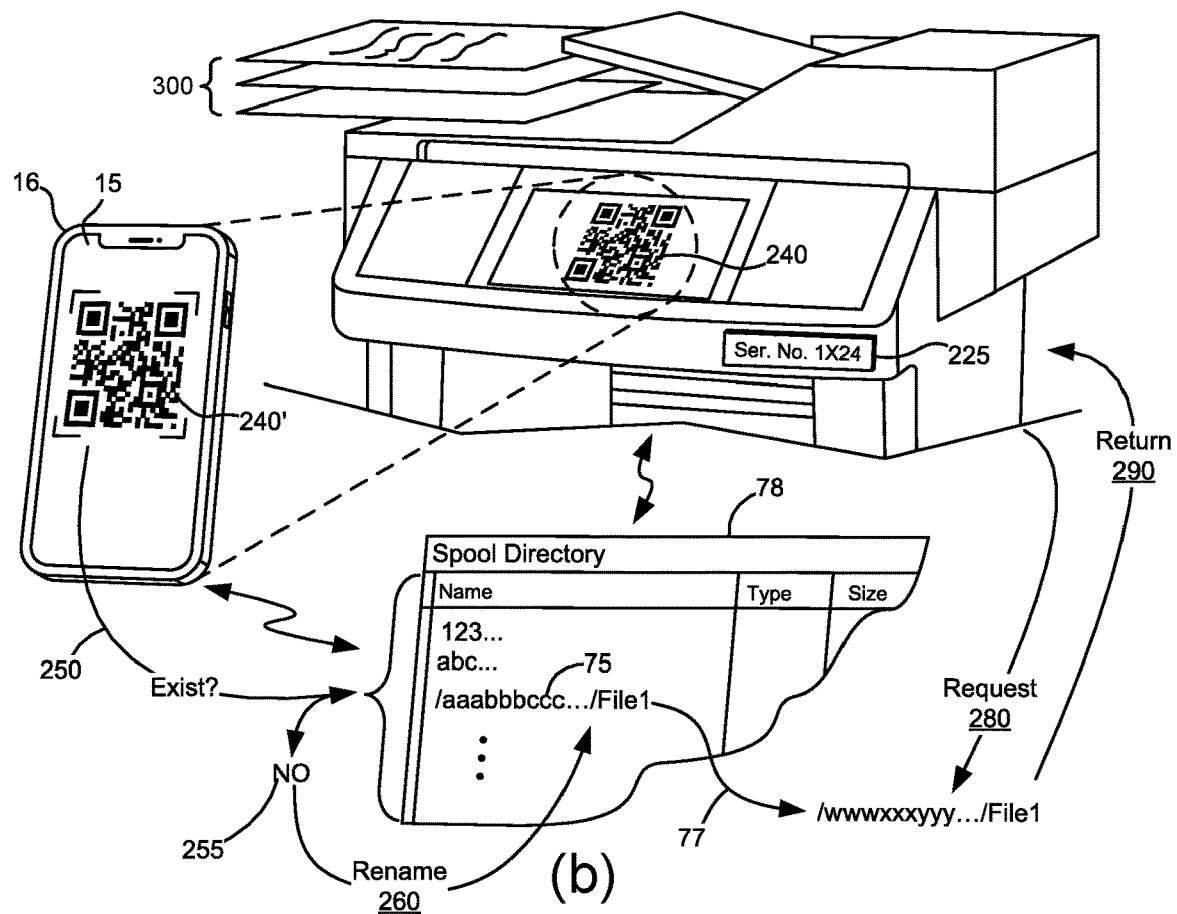

With reference to FIG. 3, users approach the imaging device 200 to retrieve their imaging job. At process 3(a), users interact with a user interface 210 of the imaging device and engage the appropriate computing device application 212 hosted on a controller C. The controller typifies one or more (micro)processors, ASICs, circuits, etc. In this instance, the users select 215 the computing application 'mobile print release' 212 to request imaging of their content, earlier stored on the spool directory by the mobile computing device. At process 3(b), this causes the controller of the imaging device to generate a quick response code 240 for display to the user on the user interface. The code is generated in a variety of ways, but the inventors contemplate generating a hash based on a timestamp of when the user initiates the device application 212 and or hashing a serial number 225 of the imaging device. Of course, other schemes are possible. Next, upon opening an instance of their QR reader or their mobile printing app 15 on their mobile computing device 16, the quick response code 240' is captured by the mobile computing device. The camera function 27 (FIG. 1) enables this aspect.

Once captured, the mobile computing imaging device determines whether or not 250 there already exists a name on the spool directory 78 corresponding to the quick response code. If so, the imaging device 200 generates a new quick response code and the process repeats. If not, the mobile computing device renames 260 the unique name 75 of the content earlier stored on the spool directory 78 with another unique name 77 corresponding to the hash embodied in the quick response code 240. In this way, because the imaging device knows the quick response code it already generated, the imaging device 200 can now find for printing the content corresponding thereto. Once renamed, the imaging device requests 280 the renamed content and such is returned 290 to the imaging device from the spool directory. The imaging device prints the content on media 300 for hard copy pick up by the user.

The relative advantages of the many embodiments should be now apparent to those skilled in the art. Among them, a more flexible way of executing mobile printing release is accomplished through community or kiosk printers. The simplicity and flexibility of this solution maintains security but does so without extra dedicated hardware or having each imaging device know security credentials of users.

The foregoing illustrates various aspects of the invention. It is not intended to be exhaustive. Rather, it is chosen to provide the best illustration of the principles of the invention and its practical application to enable one of ordinary skill in the art to utilize the invention. All modifications and variations are contemplated within the scope of the invention as determined by the appended claims. Relatively apparent modifications include combining one or more features of various embodiments with features of other embodiments.

The invention claimed is:

1. An imaging device configured for communication with a mobile computing device, the mobile computing device having earlier stored a file on a spool directory for imaging on media by the imaging device, the file having a unique name corresponding thereto, comprising:
   a controller;
   an application installed for operation on the controller; and
   a user interface for displaying a quick response code to a user of the mobile computing device, the controller configured to generate the quick response code for capture by the mobile computing device upon the user of the mobile computing device accessing the application installed for operation on the controller and requesting imaging of the file on the media and configured to request the file from the spool directory by using the quick response code after the mobile computing device renames the unique name of the file stored on the spool directory with the quick response code.

2. The imaging device of claim 1, wherein the controller is configured to verify whether the spool directory already has an address named with the quick response code.

3. The imaging device of claim 1, wherein the controller is configured to said generate the quick response code with a timestamp corresponding to the requesting imaging of the file by the user.

4. The imaging device of claim 1, wherein the controller is configured to said generate the quick response code with a serial number of the imaging device.

5. A computing storage device having an application stored thereon for download onto a controller of a mobile computing device for imaging on media of an imaging device a file accessible by the mobile computing device, comprising:
   a module to allow a camera of the mobile computing device to capture a quick response code generated on a user interface by the imaging device;
   a module to allow a user of the mobile computing device to select the file for imaging on the media of the imaging device;
   a module to allow the mobile computing device to uniquely name the file for storage on a spool directory accessible by the mobile computing device and the imaging device; and
   a module to allow the mobile computing device to rename with the quick response code the unique name of the file on the spool directory.

6. The computing storage device of claim 5, wherein the module to allow the mobile computing device to uniquely name the file for storage is configured to allow the mobile computing device to access a clock thereof to generate a unique hash based on a timestamp when the user said selects the file.

7. The computing storage device of claim 5, wherein the module to allow the mobile computing device to uniquely name the file for storage is configured to allow the mobile computing device to access a serial number of the mobile computing device to generate a unique hash based on the serial number when the user said selects the file.

8. A system for imaging content on media, comprising a spool directory, an imaging device having the media and a mobile computing device having access to the content,
   the mobile computing device further having
      a camera to capture a quick response code,
      an application to allow a user of the mobile computing device to select a file containing the content for imaging on the media of the imaging device, wherein the application allows a unique naming of the file for storage on the spool directory accessible by the mobile computing device and the imaging device, and
   the imaging device further having
      a controller, and
      a device application installed for operation on the controller, and
      a user interface for displaying the quick response code to a user of the mobile computing device, the controller configured to generate the quick response code for capture by the camera of the mobile computing device upon the user of the mobile computing device accessing the device application and requesting imaging of the content of the file on the media,
   wherein the application of the mobile computing device is configured to use the captured quick response code to rename on the spool directory the unique naming of the file so the controller of the imaging device can retrieve the file from the spool directory and image on the media the content of the file.

9. The system of claim 8, wherein the mobile computing device is a smart phone.

10. The system of claim 8, wherein the application of the mobile computing device is configured to access a clock to generate a unique hash for the unique naming based on a timestamp when the user said selects the file.

11. The system of claim 8, wherein the application of the mobile computing device is configured access a serial number of the mobile computing device to generate a unique hash for the unique naming based on the serial number when the user said selects the file.

12. The system of claim 8, wherein the mobile computing device and the imaging device are configured to verify whether the spool directory has a duplicately named file.

13. The system of claim 8, wherein the controller is configured to said generate the quick response code with a timestamp corresponding to the requesting imaging of the content of the file by the user.

14. The system of claim 8, wherein the controller is configured to said generate the quick response code with a serial number of the imaging device.

15. A method for imaging on media of an imaging device files accessible by a mobile computing device, comprising:
   selecting for imaging a file accessible by the mobile computing device;
   uniquely naming the file for storage on a spool directory accessible by the imaging device;

upon a user of the mobile computing device engaging the imaging device for requesting imaging of the file, generating a quick response code on a user interface of the imaging device; and renaming with the quick response code the file stored on the spool directory.

16. The method of claim 15, further including capturing with a camera of the mobile computing device the quick response code on the user interface.

17. The method of claim 15, further including generating the quick response with a timestamp corresponding to the requesting the imaging of the file.

18. The method of claim 15, further including installing an application on the mobile computing device for the selecting the file and the uniquely naming.

19. The method of claim 15, further including using a timestamp to said uniquely name the file.

20. The method of claim 15, further including receiving from a user the selection of the file.

\* \* \* \* \*